(12) United States Patent
Naoi

(10) Patent No.: US 11,270,726 B2
(45) Date of Patent: Mar. 8, 2022

(54) MAGNETIC RECORDING MEDIUM AND MAGNETIC RECORDING AND REPRODUCING DEVICE

(71) Applicant: FUJIFILM Corporation, Tokyo (JP)

(72) Inventor: Kenji Naoi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/830,702

(22) Filed: Mar. 26, 2020

(65) Prior Publication Data
US 2020/0312363 A1  Oct. 1, 2020

(30) Foreign Application Priority Data
Mar. 27, 2019 (JP) .............................. JP2019-061244

(51) Int. Cl.
G11B 5/714 (2006.01)
G11B 5/706 (2006.01)
G11B 5/733 (2006.01)

(52) U.S. Cl.
CPC .......... *G11B 5/714* (2013.01); *G11B 5/70621* (2013.01); *G11B 5/733* (2013.01)

(58) Field of Classification Search
CPC ..... G11B 5/70621; G11B 5/714; G11B 5/733; G11B 5/70642; G11B 5/7356
See application file for complete search history.

(56) References Cited

U.S. PATENT DOCUMENTS

| 2003/0108772 A1* | 6/2003 | Noguchi | G11B 5/733 428/843 |
| 2015/0111066 A1* | 4/2015 | Terakawa | G11B 5/70 428/836.2 |
| 2017/0162220 A1 | 6/2017 | Nakashio et al. | |
| 2018/0226093 A1 | 8/2018 | Terakawa et al. | |

FOREIGN PATENT DOCUMENTS

| JP | 7-311934 A | 11/1995 |
| JP | 2003-22514 A | 1/2003 |
| JP | 2015-82329 A | 4/2015 |
| WO | 2015/198514 A1 | 12/2015 |

OTHER PUBLICATIONS

Notice of Reasons for Refusal dated Dec. 7, 2021 from the Japanese Patent Office in Japanese Application No. 2019-061244.

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

The magnetic recording medium includes a non-magnetic support; and a magnetic layer including a ferromagnetic powder, in which the ferromagnetic powder is an ε-iron oxide powder having an average particle size of 5.0 nm to 16.0 nm, a coercivity Hc in a vertical direction is 1,884 Oe to 3,141 Oe, a ten-point average roughness Rz of a surface of the magnetic layer is 35.0 nm to 45.0 nm, and a ratio Rp/Rz of a maximum peak height Rp of the surface of the magnetic layer to the Rz is 0.25 to 1.00.

20 Claims, No Drawings

MAGNETIC RECORDING MEDIUM AND MAGNETIC RECORDING AND REPRODUCING DEVICE

CROSS-REFERENCE TO RELATED APPLICATIONS

This application claims priority under 35 U.S.C 119 to Japanese Patent Application No. 2019-061244 filed on Mar. 27, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing device.

2. Description of the Related Art

In recent years, as a ferromagnetic powder used in a magnetic recording medium, an ε-iron oxide powder is attracting attention (for example, see WO/2015/198514A1).

SUMMARY OF THE INVENTION

In general, a magnetic recording medium runs in a magnetic recording and reproducing device to bring a surface of a magnetic layer and a magnetic head into contact to slide on each other, and accordingly, the data recorded on the magnetic recording medium is read and reproduced by the magnetic head. As one performance required for the magnetic recording medium, excellent electromagnetic conversion characteristics can be exhibited, in a case of reproducing the data recorded on the magnetic recording medium as described above.

In addition, the magnetic recording medium is recently used in various environments. As one aspect of a use environment of the magnetic recording medium, a high temperature and high humidity environment is used.

In consideration of these circumstances, the inventors have conducted research regarding electromagnetic conversion characteristics of a magnetic recording medium including an ε-iron oxide powder in a magnetic layer. As a result, the inventors have thought that further improvement of a magnetic recording medium of the related art including an ε-iron oxide powder in a magnetic layer is desired, from a viewpoint of satisfying both excellent electromagnetic conversion characteristics in an initial stage of running and excellent electromagnetic conversion characteristics after repeated running in a high temperature and high humidity environment.

An object of one aspect of the invention is to provide a magnetic recording medium including an ε-iron oxide powder in a magnetic layer, and having both excellent electromagnetic conversion characteristics in an initial stage of running and electromagnetic conversion characteristics after repeated running in a high temperature and high humidity environment.

According to one aspect of the invention, there is provided a magnetic recording medium comprising: a non-magnetic support; and a magnetic layer including a ferromagnetic powder, in which the ferromagnetic powder is an ε-iron oxide powder having an average particle size of 5.0 nm to 16.0 nm, a coercivity Hc in a vertical direction (hereinafter, also simply referred to as a "coercivity Hc" or "Hc") is 1,884 Oe to 3,141 Oe, a ten-point average roughness Rz of a surface of the magnetic layer is 35.0 nm to 45.0 nm, and a ratio (Rp/Rz) of a maximum peak height Rp of the surface of the magnetic layer to the Rz is 0.25 to 1.00. The unit of the coercivity Hc is 1 [kOe]=$10^6/4\pi$ [A/m].

In one aspect, the Hc may be 1,884 Oe to 2,950 Oe.
In one aspect, the Hc may be 1,884 Oe to 2,880 Oe.
In one aspect, the Hc may be 1,884 Oe to 2,500 Oe.
In one aspect, the Rz may be greater than 35.0 nm and equal to or smaller than 45.0 nm.
In one aspect, the Rz may be greater than 35.0 nm and equal to or smaller than 40.0 nm.
In one aspect, the ratio (Rp/Rz) may be 0.40 to 1.00.
In one aspect, the ratio (Rp/Rz) may be 0.40 to 0.70.
In one aspect, the ε-iron oxide powder may contain one or more kinds of atom selected from the group consisting of a gallium atom, a cobalt atom, and a titanium atom.
In one aspect, the magnetic recording medium may further include a non-magnetic layer including a non-magnetic powder between the non-magnetic support and the magnetic layer.
In one aspect, the magnetic recording medium may further include a back coating layer including a non-magnetic powder on a surface of the non-magnetic support opposite to a surface provided with the magnetic layer.

According to another aspect of the invention, there is provided a magnetic recording and reproducing device comprising: the magnetic recording medium; and a magnetic head.

According to one aspect of the invention, it is possible to provide a magnetic recording medium having excellent electromagnetic conversion characteristics in an initial stage of running and excellent electromagnetic conversion characteristics after repeated running in a high temperature and high humidity environment. In addition, according to one aspect of the invention, it is possible to provide a magnetic recording and reproducing device including such a magnetic recording medium.

DESCRIPTION OF THE PREFERRED EMBODIMENTS

Magnetic Recording Medium

One aspect of the invention relates to a magnetic recording medium including: a non-magnetic support; and a magnetic layer including a ferromagnetic powder, in which the ferromagnetic powder is an ε-iron oxide powder having an average particle size of 5.0 nm to 16.0 nm, a coercivity Hc in a vertical direction is 1,884 Oe to 3,141 Oe, a ten-point average roughness Rz of a surface of the magnetic layer is 35.0 nm to 45.0 nm, and a ratio (Rp/Rz) of a maximum peak height Rp of the surface of the magnetic layer to the Rz is 0.25 to 1.00.

WO2015/198514A1 described above discloses that a ten-point average roughness Rz is equal to or smaller than 35 nm, in a magnetic recording medium including a magnetic layer including an ε-iron oxide powder (in WO2015/198514A1, disclosed as an ε-$Fe_2O_3$ magnetic powder; for example, see paragraph 0055 of WO2015/198514A1) (Claim 1 of WO2015/198514A1). In contrast, as a result of intensive studies, the inventors have newly found that, it is possible to provide a magnetic recording medium capable of exhibiting excellent electromagnetic conversion characteristics both in an initial stage of running and after repeated running in a high temperature and high humidity environment, by setting the Rz to be 35.0 nm to 45.0 nm, and setting the ratio (Rp/Rz), and the average particle size and the coercivity Hc in the vertical direction of the ε-iron oxide powder in the ranges described above. Hereinafter, the magnetic recording medium will be further described in detail.

In the invention and the specification, the "ε-iron oxide powder" is a ferromagnetic powder having an ε-iron oxide type crystalline structure detected as a main phase by an X-ray diffraction analysis. For example, in a case where the diffraction peak of the highest hardness in the X-ray diffraction spectrum obtained by the X-ray diffraction analysis is belonged to the ε-iron oxide type crystalline structure, it is determined that the ε-iron oxide type crystalline structure is detected as a main phase. The ε-iron oxide powder in the invention and the specification includes a so-called unsubstituted ε-iron oxide powder configured with an iron atom and an oxygen atom, and a so-called substituted ε-iron oxide powder including one or more kinds of substitutional atom for substituting an iron atom.

In the invention and the specification, average particle sizes of various powder such as the ε-iron oxide powder and the like are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder.

As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an aspect in which particles configuring the aggregate directly come into contact with each other, but also includes an aspect in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

In the invention and the specification, the coercivity Hc in the vertical direction of the magnetic recording medium is a value measured in the vertical direction of the magnetic recording medium at an applied magnetic field 15 kOe and a measurement temperature 23° C.±1° C., by using a well-known device for measuring magnetic properties such as an oscillation sample type magnetic-flux meter. The vertical direction is a direction orthogonal to the surface of the magnetic layer and can also be a thickness direction of the magnetic recording medium. In the invention and the specification, the "surface of the magnetic layer" is identical to the surface of the magnetic recording medium on the magnetic layer side.

In the invention and the specification, the ten-point average roughness Rz of the surface of the magnetic layer is a ten-point average roughness Rz regulated based on JIS B 0601: 1994 and the maximum peak height Rp is the maximum peak height Rp regulated based JIS B 0601: 2013. Both the Rz and the Rp are obtained by the measurement performed using an atomic force microscope (AFM). Specifically, the Rz and the Rp are values measured in a region of the surface of the magnetic layer having an area of 40 μm×40 μm. The measurement is performed at three different measurement portions on the surface of the magnetic layer (n=3). The Rz and the Rp are obtained as an arithmetical means of three values obtained by the measurement described above. The ratio (Rp/Rz) is calculated as a ratio of the Rp to the Rz obtained as described above. In the calculation of the ratio (Rp/Rz), values with the same unit are used as the Rp and the Rz. The unit of the Rp and the Rz is, for example, "nm". As an example of measurement condition in the measurement using the AFM, the following measurement conditions can be used. The Rp and the Rz shown in examples which will be described later are values obtained by the measurement under the measurement conditions.

The measurement regarding a region of the surface of the magnetic layer of the magnetic recording medium having an area of 40 μm×40 μm is performed with an AFM (Nanoscope 4 manufactured by Veeco Instruments, Inc.) in a tapping mode. RTESP-300 manufactured by BRUKER is used as a probe, a resolution is set as 512 pixel×512 pixel, and a scan speed is set by the measurement regarding 1 screen (512 pixel×512 pixel) for 341 seconds.

ε-Iron Oxide Powder

Average Particle Size

The average particle size of the ε-iron oxide powder is 5.0 to 16.0 nm. From a viewpoint of further improving electromagnetic conversion characteristics (specifically, electromagnetic conversion characteristics in an initial stage of the running), the average particle size of the ε-iron oxide powder is preferably equal to or greater than 5.5 nm, more preferably equal to or greater than 6.0 nm, even more preferably equal to or greater than 6.5 nm, still preferably equal to or greater than 7.0 nm, still more preferably equal to or greater than 7.5 nm, still even more preferably equal to or greater than 8.0 nm, still further more preferably equal to or greater than 8.5 nm, and still even further more preferably equal to or greater than 9.0 nm. In addition, from a viewpoint of further improving electromagnetic conversion characteristics in an initial stage of the running and after repeated running in a high temperature and high humidity environment, the average particle size of the ε-iron oxide powder is preferably equal to or smaller than 15.5 nm, more preferably equal to or smaller than 15.0 nm, even more preferably equal to or smaller than 14.0 nm, still preferably equal to or smaller than 13.0 nm, and still more preferably equal to or smaller than 12.0 nm. The average particle size of the ε-iron oxide powder can be adjusted depending on the producing conditions of the ε-iron oxide powder or the like.

Producing Method of ε-Iron Oxide Powder

As a producing method of the ε-iron oxide powder, a producing method from a goethite, a reverse micelle method, and the like are known. All of the producing methods are well known. In addition, for the method of producing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. 5280-5284, J. Mater. Chem. C, 2013, 1, pp. 5200-5206 can be referred to, for example.

As an example, the ε-iron oxide powder can be obtained by a producing method of obtaining an ε-iron oxide powder, for example, through preparing a precursor of an ε-iron oxide (hereinafter, also referred to as a "precursor preparation step"), performing a coating formation process with respect to the precursor (hereinafter, also referred to as a "coating forming step"), converting the precursor into ε-iron oxide by performing heat treatment with respect to the precursor after the coating forming process (hereinafter, also referred to as a "heat treatment step"), and performing coating removing process with respect to the ε-iron oxide (hereinafter, also referred to as a "coating removing step"). Hereinafter, such a producing method will be further described. Here, the producing method described hereinafter is merely an example, and the ε-iron oxide powder according to one aspect of the invention is not limited to an ε-iron oxide powder produced by the producing method shown below.

Precursor Preparation Step

The precursor of the ε-iron oxide is a material which includes an ε-iron oxide type crystal structure as a main phase by being heated. The precursor can be hydroxide or oxyhydroxide (oxide hydroxide) containing an atom in which iron and a part of iron in the crystal structure can be substituted. The precursor preparation step can be performed by using a coprecipitation method or a reverse micelle method. Such a preparing method of the precursor is well known and the precursor preparation step of the preparing method can be performed by a well-known method. For example, regarding the preparation method of the precursor, well-known technologies disclosed in paragraphs 0017 to 0021 and examples of JP2008-174405A, paragraphs 0025 to 0046 and examples of WO2016/047559A1, and paragraphs 0038 to 0040, 0042, 0044 to 0045, and examples of WO2008/149785A1.

The ε-iron oxide not containing a substitutional atom substituted with a part of an iron atom can be represented by a compositional formula: $Fe_2O_3$. Meanwhile, the ε-iron oxide in which a part of iron atom is substituted with, for example, one to three kinds of the atom, can be represented by a compositional formula: $A^1_x A^2_y A^3_z Fe_{(2-x-y-z)} O_3$. $A^1$, $A^2$, and $A^3$ each independently represent a substitutional atom substituted with an iron atom, x, y, and z is each independently equal to or greater than 0 and smaller than 1, here, at least one thereof is greater than 0, and x+y+z is smaller than 2. The ε-iron oxide powder may or may not contain a substitutional atom substituted with an iron atom. Magnetic properties of the ε-iron oxide powder can be adjusted depending on the type and the substitution amount of the substitutional atom. In a case where the substitutional atom is contained, as the substitutional atom, one or more kinds of Ga, Co, Ti, Al, and Rh can be used, and one or more kinds of Ga, Co, and Ti are preferable. In a case of producing the ε-iron oxide powder containing a substitutional atom substituted with an iron atom, a part of a compound which is a supply source of Fe of the ε-iron oxide may be substituted with a compound of the substitutional atom. A composition of the obtained ε-iron oxide powder can be controlled in accordance with the substitution amount thereof. Examples of the compound which is a supply source of an iron atom and various substitutional atoms include an inorganic salt (may be hydrate) such as nitrate, sulfate, or chloride, an organic salt (may be hydrate) such as pentakis (hydrogen oxalate) salt, hydroxide, and oxyhydroxide.

Coating Forming Step

In a case of heating the precursor after the coating forming process, the reaction of converting the precursor into ε-iron oxide can proceed under the coating. In addition, the coating may be considered to play a role of preventing occurrence of sintering during the heating. From a viewpoint of ease of coating forming, the coating forming process is preferably performed in a solution and more preferably performed by adding a coating formation agent (compound for coating forming) to a solution containing the precursor. For example, in a case of performing the coating forming process in the same solution after the preparation of the precursor, the coating can be formed on the precursor by adding and stirring the coating formation agent to the solution after the preparation of the precursor. As a coating preferable from a viewpoint of ease of forming the coating on the precursor in the solution, a silicon-containing coating can be used. As the coating formation agent for forming the silicon-containing coating, for example, a silane compound such as alkoxysilane can be used. The silicon-containing coating can be formed on the precursor by hydrolysis of the silane compound preferably using a sol-gel method. Specific examples of the silane compound include tetraethyl orthosilicate (TEOS), tetramethoxysilane, and various silane coupling agents. For the coating forming process, for example, well-known technologies disclosed in paragraph 0022 and examples of JP2008-174405A, paragraphs 0047 to 0049 and examples of WO2016/047559A1, paragraphs 0041 and 0043 and examples of WO2008/149785A1. For example, the coating forming process can be performed by stirring a solution including the precursor and the coating formation agent at a liquid temperature of 50° C. to 90° C. for approximately 5 to 36 hours. The coating may be coated over the entire surface of the precursor or a part of the surface of the precursor which is not coated with the coating may be included.

Heat Treatment Step

By performing the heat treatment with respect to the precursor after the coating forming process, the precursor can be converted into ε-iron oxide. The heat treatment can be performed with respect to a powder collected form a solution subjected to the coating forming process (powder of the precursor including the coating). For the heat treatment step, for example, well-known technologies disclosed in a paragraph 0023 and examples of JP2008-174405A, a paragraph 0050 and examples of WO2016/047559A1, and paragraphs 0041 and 0043 and examples of WO2008/149785A1. The heat treatment step can be performed, for example, in a heat treatment furnace at a furnace inner temperature of 900° C. to 1,200° C. for approximately 3 to 6 hours.

Coating Removing Step

By performing the heat treatment step, the precursor including the coating is converted into ε-iron oxide. The coating remains on the ε-iron oxide obtained as described above, and accordingly, the coating removing process is preferably performed. For the coating removing process, for example, well-known technologies disclosed in a paragraph 0025 and examples of JP2008-174405 and a paragraph 0053 and examples of WO2008/149785A1. The coating removing process can be, for example, performed by stirring the ε-iron oxide including the coating in a sodium hydroxide aqueous solution having a concentration of approximately 4 mol/L at a liquid temperature of approximately 60° C. to 90° C. for 5 to 36 hours. Here, the ε-iron oxide powder according to one aspect of the invention may be produced through the coating removing process, that is, may include the coating. In addition, the coating may not be completely removed in the coating removing process and a part of coating may remain.

A well-known step can also be randomly performed before and/or after various steps described above. As such a step, various well-known steps such as filtering, washing, and drying can be used, for example.

Coercivity Hc in Vertical Direction

A coercivity Hc of the magnetic recording medium in a vertical direction is 1,8840 Oe to 3,141 Oe. From a viewpoint of further improving electromagnetic conversion characteristics (particularly, electromagnetic conversion characteristics in initial stage of running), the coercivity Hc is preferably smaller than 3,000 Oe, more preferably equal to or smaller than 2,950 Oe, even more preferably equal to or smaller than 2,900 Oe, still preferably equal to or smaller than 2,880 Oe, and still more preferably equal to or smaller than 2,850 Oe. In addition, from a viewpoint of further improving electromagnetic conversion characteristics (particularly, electromagnetic conversion characteristics after repeated running in high temperature and high humidity environment), the coercivity Hc is preferably equal to or greater than 1,900 Oe, more preferably equal to or greater than 1,950 Oe, and still preferably equal to or greater than 2,000 Oe. The coercivity Hc can be controlled according to the kind of the ε-iron oxide powder included in the magnetic layer.

Rz and Ratio (Rp/Rz)

In the magnetic recording medium, a ten-point average roughness Rz of the surface of the magnetic layer is 35.0 nm to 45.0 nm and a ratio (Rp/Rz) is 0.25 to 1.00. The inventors have thought that, in the magnetic recording medium including the magnetic layer including ε-iron oxide powder having an average particle size in the range described above, in a case where there is no countermeasure, a surface shape of the magnetic layer after repeated running in a high temperature and high humidity environment is easily changed, and this derives a deterioration in electromagnetic conversion characteristics after the repeated running in a high temperature and high humidity environment. In contrast, the inventors have surmised that the Rz and the ratio (Rp/Rz) of the surface of the magnetic layer in the magnetic recording medium in the ranges described above contributes to prevention of a change in surface shape of the magnetic layer after the repeated running in a high temperature and high humidity environment, and also contributes to the improvement in electromagnetic conversion characteristics in the initial stage of running. Here, the invention is not limited to the surmise described above. In addition, the invention is not limited to the other surmise disclosed in the specification.

From a viewpoint of further improving electromagnetic conversion characteristics in the initial stage of running and after the repeated running in a high temperature and high humidity environment, the Rz is preferably greater than 35.0 nm, more preferably equal to or greater than 35.5 nm, and even more preferably equal to or greater than 36.0 nm. In addition, from the same viewpoint, the Rz is preferably equal to or smaller than 43.0 nm, more preferably equal to or smaller than 40.0 nm, and even more preferably equal to or smaller than 38.0 nm.

In addition, the ratio (Rp/Rz) is a value which is an index of a percentage of projection occupying the ruggedness of the surface of the magnetic layer, and from a viewpoint of further improving electromagnetic conversion characteristics in the initial stage of running and after the repeated running in a high temperature and high humidity environment, the ratio (Rp/Rz) is preferably equal to or greater than 0.25, more preferably equal to or greater than 0.30, even more preferably equal to or greater than 0.35, still preferably equal to or greater than 0.40, and still more preferably equal to or greater than 0.45. From the same viewpoint, the ratio (Rp/Rz) is preferably equal to or smaller than 0.95, more preferably equal to or smaller than 0.90, even more preferably equal to or smaller than 0.85, still preferably equal to or smaller than 0.80, still more preferably equal to or smaller than 0.75, still even more preferably equal to or smaller than 0.70, and still furthermore preferably equal to or smaller than 0.65.

In the magnetic recording medium, the Rp is not particularly limited, as long as Rz and the ratio (Rp/Rz) are in the range described above. As an example, Rp can be, for example, 2.0 nm to 55.0 nm and can also be 4.0 nm to 45.0 nm.

The Rz and the ratio (Rp/Rz) represent the surface shape of the magnetic layer and can be controlled in accordance with sizes and contents of various powders included in the magnetic layer, and manufacturing conditions of the magnetic recording medium (for example, dispersion conditions during preparation of magnetic layer forming composition, and calendar process condition which will be described later).

Hereinafter, the magnetic layer and the like of the magnetic recording medium will be described in detail.

Magnetic Layer

Ferromagnetic Powder

The magnetic layer of the magnetic recording medium includes an ε-iron oxide powder as a ferromagnetic powder. Details thereof are as described above. A content (filling percentage) of the ferromagnetic powder in the magnetic layer is preferably 50% to 90% by mass and more preferably 60% to 90% by mass. A high filling percentage of the ferromagnetic powder in the magnetic layer is preferable from a viewpoint of improvement of recording density.

Non-Magnetic Powder

The magnetic recording medium can include one or more kinds of non-magnetic powders in the magnetic layer. The non-magnetic powder preferably includes at least a non-magnetic powder contributing to formation of a projection on the surface of the magnetic layer (hereinafter, referred to as a "projection formation agent"). In addition, the magnetic layer also preferably includes a non-magnetic powder capable of functioning as an abrasive (hereinafter, referred to as an "abrasive") as the non-magnetic powder. For example, the Rz and the ratio (Rp/Rz) of the surface of the magnetic layer can be controlled by adjusting the kind and the content of these non-magnetic powder. Hereinafter, the projection formation agent and an abrasive will be described in detail.

Projection Formation Agent

The projection formation agent may be an inorganic powder and an organic powder. Examples of the inorganic powder include powder of inorganic oxide such as metal oxide, metal carbonate, metal sulfate, metal nitride, metal carbide, and metal sulfide, and a powder of inorganic oxide is preferable. An average particle size of the projection formation agent is, for example, preferably 90 to 200 nm and more preferably 100 to 150 nm. In one aspect, from a viewpoint of homogenization of friction properties, particle size distribution of the projection formation agent is not polydispersion having a plurality of peaks in the particle size distribution and is preferably monodisperse showing a single peak. From a viewpoint of availability of monodisperse particles, the projection formation agent is preferably an inorganic powder and more preferably colloidal particles. The "colloidal particles" in the invention and the specification are particles which are not precipitated but dispersed to generate a colloidal dispersion, in a case where 1 g of the particles is added to 100 mL of at least one organic solvent of methyl ethyl ketone, cyclohexanone, toluene, or ethyl acetate, or a mixed solvent including two or more kinds of the solvent described above at a random mixing ratio. The fact that the non-magnetic powder included in the magnetic layer is colloidal particles may be determined by evaluating whether or not such a non-magnetic powder has properties corresponding to the definition of the colloidal particles described above, as long as the non-magnetic powder used in the formation of the magnetic layer can be available. Alternatively, it is also possible to evaluate whether or not the non-magnetic powder extracted from the magnetic layer has properties corresponding to the definition of the colloidal particles described above. The extraction of the non-magnetic powder from the magnetic layer can be performed by a method described in a paragraph 0045 of JP2017-068884A, for example.

Specific examples of the colloidal particles include inorganic oxide colloidal particles such as $SiO_2$, $Al_2O_3$, $TiO_2$, $ZrO_2$, or $Fe_2O_3$, and include colloidal particles of composite inorganic oxide such as $SiO_2.Al_2O_3$, $SiO_2.B_2O_3$, $TiO_2.CeO_2$, $SnO_2.Sb_2O_3$, $SiO_2.Al_2O_3.TiO_2$, $TiO_2.CeO_2.SiO_2$. "." used for description of the composite inorganic oxide is used for showing composite inorganic oxide of inorganic oxides described before and after the symbol. For example, $SiO_2.Al_2O_3$ means composite inorganic oxide of $SiO_2$ and $Al_2O_3$. As the colloidal particles, colloidal particles of silicon dioxide $SiO_2$ (silica), that is, silica colloidal particles (also referred to as "colloidal silica") are particularly preferable. In addition, for the colloidal particles, a description disclosed in paragraphs 0048 and 0049 of JP2017-068884A can also be referred to.

A content of the projection formation agent in the magnetic layer is preferably 0.1 to 10.0 parts by mass, more preferably 0.1 to 5.0 parts by mass, and even more preferably 1.0 to 5.0 parts by mass, with respect to 100.0 parts by mass of the ferromagnetic powder. In the invention and the specification, a given component may be used as one kind or two or more kinds. In a case of using two or more kinds, the content thereof is a total content of two or more kinds.

Abrasive

An abrasive is a component capable of exhibiting ability of removing attachment attached to the magnetic head during the running (abrasive properties). As the abrasive, powders of alumina ($Al_2O_3$), silicon carbide, boron carbide ($B_4C$), TiC, chromium oxide ($Cr_2O_3$), cerium oxide, zirconium oxide ($ZrO_2$), iron oxide, or diamond which are materials generally used as the abrasive of the magnetic layer can be used, and among these, powders of alumina such as α-alumina, silicon carbide, and diamond are preferable. An average particle size of the abrasive is preferably 20 nm to 200 nm and more preferably 30 nm to 150 nm. A content of the abrasive in the magnetic layer is preferably 1.0 to 20.0 parts by mass, more preferably 3.0 to 15.0 parts by mass, and even more preferably 4.0 to 10.0 parts by mass, with respect to 100.0 parts by mass of the ferromagnetic powder.

Binding Agent and Curing Agent

The magnetic recording medium can be a coating type magnetic recording medium and include a binding agent in the magnetic layer. The binding agent is one or more kinds of resin. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-024113A can be referred to. A content of the binding agent in the magnetic layer can be, for example, 1.0 to 30.0 parts by mass with respect to 100.0 parts by mass of the ferromagnetic powder. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions. The content of the binding agent can be, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in a magnetic layer forming step. The same also applies to a layer formed using this composition, in a case where a composition used for forming other layers include the curing agent. The preferred curing agent is a thermosetting compound, polyisocyanate is suitable. For details of the polyisocyanate, descriptions disclosed in paragraphs 0124 and 0125 of JP2011-216149A can be referred to, for example. A content of the curing agent in the magnetic layer forming composition can be, for example, 0 to 80.0 parts by mass and is preferably 50.0 to 80.0 parts by mass with respect phenoxy resin, and a polyvinylalkylal resin such as polyvinyl acetal or polyvinyl butyral can be used to 100.0 parts by mass of the binding agent.

Additives

The magnetic layer may include one or more kinds of additives, if necessary. As an example of the additive, the non-magnetic powder and the curing agent are used. Examples of the additive included in magnetic layer include a lubricant, a dispersing agent, a dispersing assistant, an antibacterial agent, an antistatic agent, and an antioxidant. As the additives, a commercially available product can be suitably selected according to the desired properties or manufactured by a well-known method, and can be used with any amount. For example, for the lubricant, a description disclosed in paragraphs 0030 to 0033, 0035, and 0036 of JP2016-126817A can be referred to. The lubricant may be included in the non-magnetic layer which will be described later. For the lubricant which can be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be added to a non-magnetic layer forming composition. For the dispersing agent which can be added to the non-magnetic layer forming composition, a description disclosed in paragraph 0061 of JP2012-133837A can be referred to. As an example of the additive which can be used in the magnetic layer including the abrasive for improving dispersibility of the abrasive, a dispersing agent disclosed in paragraphs 0012 to 0022 of JP2013-131285A can be used.

Non-Magnetic Layer

In one aspect, the magnetic recording medium can include a magnetic layer directly on the non-magnetic support. In another aspect, the magnetic recording medium can also include a non-magnetic layer including non-magnetic powder between the non-magnetic support and the magnetic layer.

The non-magnetic powder used in the non-magnetic layer may be a powder of an inorganic substance (inorganic powder) or a powder of an organic substance (organic powder). In addition, carbon black and the like can be used. Examples of the inorganic substance include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, a description of paragraphs 0040 and 0041 of JP2010-024113A can be referred to. The content (filling percentage) of the non-magnetic powder of the non-magnetic layer is preferably 50% to 90% by mass and more preferably 60% to 90% by mass.

The non-magnetic layer can include a binding agent and can also include one or more additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The "non-magnetic layer" of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. It is preferable that the non-magnetic layer does not have a residual magnetic flux density and coercivity.

$$1[kOe]=10^6/4\pi[A/m]$$

Non-Magnetic Support

As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium can also include or may not include a back coating layer including a non-magnetic powder on a surface of the non-magnetic support opposite to the surface provided with the magnetic layer. The back coating layer preferably includes any one or both of carbon black and inorganic powder. The back coating layer can include a binding agent or can also include one or more kinds of additives. In regards to the binding agent included in the back coating layer and various additives which can be randomly included therein, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Non-Magnetic Support and Thickness of Each Layer

A thickness of the non-magnetic support is preferably 3.0 to 20.0 urn, more preferably 3.0 to 10.0 µm, and even more preferably 3.0 to 6.0 µm.

A thickness of the magnetic layer can be optimized according to a saturation magnetization amount of a magnetic head used, a head gap length, a recording signal band, and the like. The thickness of the magnetic layer is preferably 10 nm to 150 nm, more preferably 20 nm to 120 nm, and even more preferably 30 nm to 100 nm, from a viewpoint of realizing high-density recording. The magnetic layer may be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.05 to 1.5 µm and preferably 0.1 to 1.0 µm.

A thickness of the back coating layer is preferably equal to or smaller than 0.9 µm and even more preferably 0.1 to 0.7 µm.

The thicknesses of various layers and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a scanning electron microscope. In the cross section observation, various thicknesses can be obtained as the thickness obtained at one portion, or as an arithmetical mean of thicknesses obtained at a plurality of portions which are two or more portions randomly extracted, for example, two portions. Alternatively, the thickness of each layer may be obtained as a designed thickness calculated under the manufacturing conditions.

Manufacturing Method of Magnetic Recording Medium

A step of preparing compositions for forming the magnetic layer, and the non-magnetic layer and the back coating layer randomly provided, can generally include at least a kneading step, a dispersing step, and a mixing step provided before and after these steps, if necessary. Each step may be divided into two or more stages. The component used in the preparation of each layer forming composition may be added at an initial stage or in a middle stage of each step. In addition, each raw material may be separately added in two or more steps. In order to prepare each layer forming composition, a well-known manufacturing technology can be used. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. In addition, in order to disperse each layer forming composition, glass beads and one or more kinds of dispersion beads selected from the group consisting of other dispersion beads can be used as a dispersion medium. As such dispersion beads, zirconia beads, titanic beads, and steel beads which are dispersion beads having high specific gravity are suitable. These dispersion beads can be used by optimizing a particle diameter (bead diameter) and a filling percentage. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 µm (for example, filter made of glass fiber or filter made of polypropylene) can be used, for example.

The magnetic layer can be formed through a step of directly applying the magnetic layer forming composition onto a surface of the non-magnetic support or performing multilayer coating with the non-magnetic layer forming composition in order or at the same time. The back coating layer can be formed through a step of applying the back coating layer forming composition on a surface of the non-magnetic support on a side opposite to the surface provided with (or to be provided with) the magnetic layer.

For the other various steps for manufacturing the magnetic recording medium, a description disclosed in a paragraphs 0067 to 0070 of JP2010-231843A can be referred to, for example. For example, in an aspect of performing an alignment process, while the coating layer of the magnetic layer forming composition is wet, the alignment process is performed with respect to the coating layer in an alignment zone. For the alignment process, various technologies disclosed in a paragraph 0052 of JP2010-024113A can be applied. For example, a homeotropic alignment process can be performed by a well-known method such as a method using a different polar facing magnet. In the alignment zone, a drying speed of the coating layer can be controlled by a temperature, an air flow of the dry air and/or a transporting rate in the alignment zone. In addition, the coating layer may be preliminarily dried before transporting to the alignment zone. In addition, as the process for adjusting the surface shape of the magnetic recording medium, a calendar process can be performed. The Rz and the ratio (Rp/Rz) of the surface of the magnetic layer can be controlled according to the calendar process conditions. Regarding the conditions of the calendar process, for example, a calendar pressure (linear pressure) can be 200 to 500 kN/m and is preferably 250 to 350 kN/m. A calendar temperature (surface temperature of a calendar roll) can be, for example, 70° C. to 120° C. and is preferably 80° C. to 100° C., and the calendar speed can be, for example, 50 to 300 m/min and is preferably 50 to 200 m/min.

A servo pattern can be formed on the magnetic recording medium manufactured as described above by a well-known method, in order to realize tracking control of a magnetic head of the magnetic recording and reproducing device and control of a running speed of the magnetic recording medium. The "formation of the servo pattern" can be "recording of a servo signal". The magnetic recording medium may be a tape-shaped magnetic recording medium (magnetic tape) or a disk-shaped magnetic recording medium (magnetic disk). Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319, a timing-based servo system is used in a magnetic tape based on a linear tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319, information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 µm, 1 to 10 µm, or equal to or greater than 10 um.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape is generally accommodated in a magnetic tape cartridge and the magnetic tape cartridge is mounted in a magnetic recording and reproducing device.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data to the magnetic tape, the magnetic tape is drawn from the magnetic tape cartridge and wound around the reel on the magnetic recording and reproducing device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic recording and reproducing device side. In the meantime, the magnetic head comes into contact with and slides on the surface of the magnetic layer of the magnetic tape, and accordingly, the recording and/or reproduction of the data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. For other details of the magnetic tape cartridge, a well-known technology can be used.

The magnetic recording medium according to one aspect of the invention described above can show excellent electromagnetic conversion characteristics, in the initial stage of running and after the repeated running in the high temperature and high humidity environment. As an example, the environment of high humidity can be, for example, an environment of relative humidity of 70 to 100%, and the high temperature can be, for example, approximately 25° C. to 50° C.

Magnetic Recording and Reproducing Device

One aspect of the invention relates to a magnetic recording and reproducing device including the magnetic recording medium and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which a surface of a magnetic layer and a magnetic head are in contact with each other and slide on each other, in a case of performing the recording of data on a magnetic recording medium and/or the reproducing of the recorded data.

The magnetic head included in the magnetic recording and reproducing device can be a recording head capable of performing the recording of data on the magnetic recording medium, and can also be a reproducing head capable of performing the reproducing of data recorded on the magnetic recording medium. In addition, in the aspect, the magnetic recording and reproducing device can include both of a recording head and a reproducing head as separate magnetic heads. In another aspect, the magnetic head included in the magnetic recording and reproducing device can also have a configuration of comprising both of an element for recording data (recording element) and an element for reproducing data (reproducing element) in one magnetic head. Hereinafter, the element for recording data and the element for reproducing are collectively referred to as "elements for data". As the reproducing head, a magnetic head (MR head) including a magnetoresistive (MR) element capable of reading data recorded on the magnetic tape with excellent sensitivity as the reproducing element is preferable. As the MR head, various well-known MR heads such as an Anisotropic Magnetoresistive (AMR) head, a Giant Magnetoresistive (GMR) head, or a Tunnel Magnetoresistive (TMR) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing device. The magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic recording and reproducing device, the recording of data on the magnetic recording medium and/or the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to the aspect of the invention, and well-known technologies can be applied for the other configurations.

For example, in a case of the recording of data on the magnetic recording medium on which the servo pattern is formed and/or the reproducing of the recorded data, first, the tracking is performed by using the servo signal obtained by the reading of the servo pattern. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can perform the recording and/or the reproducing with respect to other data bands. In this case, the servo signal reading element is moved to a predetermined servo band by using the UDIM information described above, and the tracking with respect to the servo band may be started.

EXAMPLES

Hereinafter, the invention will be described with reference to examples. However, the invention is not limited to aspects shown in the examples. "Parts" and "%" in the following description are based on mass, unless otherwise noted. In addition, steps and evaluations described below are performed in an environment of an atmosphere temperature of 23° C.±1° C., unless otherwise noted. "eq" described below indicates equivalent and a unit not convertible into SI unit.

Example 1

Producing of ε-Iron Oxide Powder 3.6 g of ammonia aqueous solution having a concentration of 25% was added to a material obtained by dissolving 8.3 g of iron (III) nitrate nonahydrate, 1.25 g of gallium (III) nitrate octahydrate, 189 mg of cobalt (III) nitrate hexahydrate, 152 mg of titanium (III) sulfate, and 1.0 g of polyvinyl pyrrolidone (PVP) in 92.3 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid aqueous solution obtained by dissolving 0.85 g of citric acid in 9.15 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the liquid temperature of 50° C., and 13.3 mL of tetraethoxysilane (TEOS) was added dropwise and stirred for 24 hours. 51 g of ammonium sulfate was added to the obtained reaction solution, the precipitated powder was collected by centrifugal separation, washed with pure water, and dried in a heating furnace at a furnace inner temperature of 80° C., and a precursor of ε-iron oxide was obtained.

The heating furnace at a furnace inner temperature of 1029° C. (firing temperature) was filled with the obtained powder of precursor in the atmosphere and subjected to heat treatment for 4 hours.

The heat-treated powder was put into sodium hydroxide (NaOH) aqueous solution having a concentration of 4 mol/L, the liquid temperature was held at 70° C., stirring was performed for 24 hours, and accordingly, a silicon acid compound was removed from the heat-treated powder. This powder was collected by a centrifugal separation process and washed with pure water, and a powder was obtained.

Regarding the obtained powder, an X-ray diffraction analysis was performed. The X-ray diffraction analysis was performed by scanning CuKα ray under the condition of a voltage of 45 kV and intensity of 40 mA and measuring an X-ray diffraction pattern under the following conditions. It was confirmed that the produced ferromagnetic powder does not have a crystal structure of an α phase and a γ phase and has a crystal structure of a single phase which is an ε phase (ε-iron oxide type crystal structure) from the peak of the XRD pattern obtained by the X-ray diffraction analysis. That is, it was confirmed that the ε-iron oxide powder was produced.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees Regarding each ferromagnetic powder produced by the method which will be described later, the X-ray diffraction analysis was performed in the same manner as in Example 1, each ferromagnetic powder does not have a crystal structure of an α phase and a γ phase and substantially has a crystal structure of a single phase which is an ε phase (ε-iron oxide type crystal structure). That is, ε-iron oxide powder was confirmed.

Manufacturing of Magnetic Recording Medium (Magnetic Tape)

(1) List of Magnetic Layer Forming Composition
Magnetic liquid
Ferromagnetic powder (see Table 1): 100.0 parts
$SO_3Na$ group-containing polyurethane resin: 14.0 parts
(Weight-average molecular weight: 70,000, $SO_3Na$ group: 0.4 meq/g)
Cyclohexanone: 150.0 parts
Methyl ethyl ketone: 150.0 parts
Oleic acid: 2.0 parts
Non-magnetic powder liquid
Alumina abrasive (average particle size: 100 nm): 4.0 parts
Colloidal silica (average particle size: 100 nm): 0.2 parts
Sulfonic acid group-containing polyurethane resin: 0.3 parts
(Weight-average molecular weight: 70,000, $SO_3Na$ group: 0.3 meq/g)
Cyclohexanone: 53.4 parts
Methyl ethyl ketone: 1.4 parts
Other components
Stearic acid: 2.0 parts
Butyl stearate: 6.0 parts
Polyisocyanate (CORONATE manufactured by Tosoh Corporation): 2.5 parts
Finishing Additive Solvent
Cyclohexanone: 200.0 parts
Methyl ethyl ketone: 200.0 parts (2) List of Non-Magnetic Layer Forming Composition
Non-magnetic inorganic powder: (α-iron oxide): 100.0 parts
average particle size: 10 nm
average aspect ratio: 1.9
BET (Brunauer-Emmett-Teller) specific surface area: 75 $m^2/g$
Carbon black (average particle size: 20 nm): 25.0 parts
$SO_3Na$ group-containing polyurethane resin: 18.0 parts
(Weight-average molecular weight: 70,000, $SO_3Na$ group: 0.2 meq/g)
Stearic acid: 1.0 part
Cyclohexanone: 300.0 parts
Methyl ethyl ketone: 300.0 parts (3) List of Back Coating Layer Forming Composition
Non-magnetic inorganic powder
α-iron oxide: 80.0 parts
average particle size: 0.15 μm
average aspect ratio: 7
BET specific surface area: 52 $m^2/g$
Carbon black (average particle size: 20 nm): 20.0 parts
Vinyl chloride copolymer: 13.0 parts
Sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts (4) Manufacturing of Magnetic Tape
Various components of the magnetic liquid were dispersed by using a batch type vertical sand mill for 12 hours to prepare a magnetic liquid. As dispersion beads, zirconia beads having a particle diameter of 0.1 mm were used.

The non-magnetic powder solution was prepared by the following method. The various components were kneaded with a kneader, transferred to a transverse sand mill containing zirconia beads (particle diameter of 0.5 mm) by the filling amount which is 65 volume % with respect to a volume of a dispersion portion by a pump, and dispersed at 2,000 revolution per minutes (rpm) for 180 minutes (time for which the component is substantially held in the dispersion portion). The obtained dispersion liquid was filtered by using a filter having a hole diameter of 1 μm.

The magnetic liquid and the non-magnetic powder solution obtained as described above were mixed with other components (other components and the finishing additive solvent) and subjected to treatment (ultrasonic dispersion) with a batch type ultrasonic device (20 kHz, 300 W) for 60 minutes. After that, the obtained mixture was filtered with a filter having a hole diameter of 0.45 μm, and a magnetic layer forming composition was prepared.

For the non-magnetic layer forming composition, the various components were dispersed by using a batch type vertical sand mill for 24 hours. As dispersion beads, zirconia beads having a particle diameter of 0.1 mm were used. The obtained dispersion liquid was filtered with a filter having a hole diameter of 0.45 μm and a non-magnetic layer forming composition was prepared.

For the back coating layer forming composition, the various components described above excluding the lubricant (stearic acid and butyl stearate), polyisocyanate, and 200.0 parts of cyclohexanone were kneaded and diluted by an open kneader. Then, the obtained mixed liquid was subjected to a dispersion process of 12 passes, with a transverse beads mill dispersing device by using zirconia beads having a particle diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The obtained dispersion liquid described above was filtered with a filter having an average hole diameter of 1 μm and a back coating layer forming composition was prepared.

After that, the non-magnetic layer forming composition was applied and dried on a biaxial stretching polyethylene naphthalate support having a thickness of 5.0 μm so that a thickness after drying is 0.1 μm, and the magnetic layer forming composition was applied so that a thickness after drying is 70 nm, a coating layer was formed. While this coating layer is wet, a homeotropic alignment process was performed by applying a magnetic field having a magnetic field strength of 0.6 T in a direction vertical to the surface of the coating layer, and the coating layer was dried. After that, the back coating layer forming composition was applied to a surface of the support on a side opposite to the surface where the non-magnetic layer and the magnetic layer are formed, so that the thickness after drying becomes 0.4 μm, and dried, and accordingly, a back coating layer was formed.

Then, a surface smoothing treatment (calendar process) was performed with a calendar configured of only a metal roll, at a speed of 100 m/min, linear pressure of 294 kN/m, and a surface temperature of a calendar roll of 100° C., and the heating treatment was performed in the environment of the atmosphere temperature of 70° C. for 36 hours. After the heating treatment, the slitting was performed to have a width of ½ inches (1 inch is 0.0254 meters), and a magnetic tape was obtained.

Example 2

An ε-iron oxide powder was produced in the same manner as in the producing of the ε-iron oxide powder of Example 1, except that gallium (III) nitrate octahydrate, cobalt (III) nitrate hexahydrate, and titanium (III) sulfate were not included and the firing temperature was changed to 982° C.

A magnetic tape was obtained in the same manner as in Example 1, except that the ε-iron oxide powder produced as described above was used as the ferromagnetic powder for forming the magnetic layer.

Comparative Example 1

A magnetic tape of Comparative Example 1 was obtained in the same manner as in Example 2, except that the firing temperature in the producing of the ε-iron oxide powder was changed to 974° C.

Example 3

An ε-iron oxide powder was produced in the same manner as in the producing of the ε-iron oxide powder of Example 1, except that the amount of gallium (III) nitrate octahydrate used was changed to 52 mg, cobalt (III) nitrate hexahydrate and titanium (III) sulfate were not included, and the firing temperature was changed to 993° C.

A magnetic tape was obtained in the same manner as in Example 1, except that the ε-iron oxide powder produced as described above was used as the ferromagnetic powder for forming the magnetic layer.

Example 4

An ε-iron oxide powder was produced in the same manner as in the producing of the ε-iron oxide powder of Example 1, except that the amount of gallium (III) nitrate octahydrate used was changed to 1.56 g, and the firing temperature was changed to 1046° C.

A magnetic tape was obtained in the same manner as in Example 1, except that the ε-iron oxide powder produced as described above was used as the ferromagnetic powder for forming the magnetic layer.

Comparative Example 2

An ε-iron oxide powder was produced in the same manner as in the producing of the ε-iron oxide powder of Example 1, except that the amount of gallium (III) nitrate octahydrate used was changed to 1.67 g, and the firing temperature was changed to 1054° C.

A magnetic tape was obtained in the same manner as in Example 1, except that the ε-iron oxide powder produced as described above was used as the ferromagnetic powder for forming the magnetic layer.

Comparative Example 3

A magnetic tape was obtained in the same manner as in Example 1, except that the amount of alumina abrasive of the non-magnetic powder liquid for preparing the magnetic layer forming composition was set as 3.0 parts, and the calendar temperature in the calendar process (surface temperature of calendar roll) was changed to 94° C.

Example 5

A magnetic tape was obtained in the same manner as in Comparative Example 3, except that the calendar temperature in the calendar process (surface temperature of calendar roll) was changed to 90° C.

Example 6

A magnetic tape was obtained in the same manner as in Example 1, except that the amount of alumina abrasive of the non-magnetic powder liquid for preparing the magnetic layer forming composition was set as 4.5 parts, and the calendar temperature in the calendar process (surface temperature of calendar roll) was changed to 94° C.

Comparative Example 4

A magnetic tape was obtained in the same manner as in Example 6, except that the calendar temperature in the calendar process (surface temperature of calendar roll) was changed to 90° C.

Comparative Example 5

A magnetic tape was obtained in the same manner as in Comparative Example 2, except that the firing temperature in the producing of the ε-iron oxide powder was changed to 1026° C.

Example 7

An ε-iron oxide powder was produced in the same manner as in the producing of the ε-iron oxide powder of Example 1, except that the amount of gallium (III) nitrate octahydrate used was changed to 1.15 g, and the firing temperature was changed to 1025° C.
A magnetic tape was obtained in the same manner as in Example 1, except that the ε-iron oxide powder produced as described above was used as the ferromagnetic powder for forming the magnetic layer.

Example 8

An ε-iron oxide powder was produced in the same manner as in the producing of the ε-iron oxide powder of Example 1, except that the amount of gallium (III) nitrate octahydrate used was changed to 0.77 g, and the firing temperature was changed to 1026° C.
A magnetic tape was obtained in the same manner as in Example 1, except that the ε-iron oxide powder produced as described above was used as the ferromagnetic powder for forming the magnetic layer.

Comparative Example 6

An ε-iron oxide powder was produced in the same manner as in the producing of the ε-iron oxide powder of Example 1, except that the amount of gallium (III) nitrate octahydrate used was changed to 0.63 g, and the firing temperature was changed to 1027° C.
A magnetic tape was obtained in the same manner as in Example 1, except that the ε-iron oxide powder produced as described above was used as the ferromagnetic powder for forming the magnetic layer.

Comparative Example 7

A magnetic tape was obtained in the same manner as in Example 1, except that hexagonal barium ferrite powder (in Table 1, "BaFe") was used as the ferromagnetic powder.

Comparative Example 8

A magnetic tape was obtained in the same manner as in Example 1, except that the amount of alumina abrasive of the non-magnetic powder liquid for preparing the magnetic layer forming composition was set as 2.5 parts, and the hole diameter of the filter used for the filtering of the back coating layer forming composition was changed to 2 μm.

Example 9

A magnetic tape was obtained in the same manner as in Example 1, except that the amount of alumina abrasive of the non-magnetic powder liquid for preparing the magnetic layer forming composition was set as 4.3 parts, and the calendar temperature in the calendar process (surface temperature of calendar roll) was changed to 97° C.

Example 10

A magnetic tape was obtained in the same manner as in Example 1, except that the amount of alumina abrasive of the non-magnetic powder liquid for preparing the magnetic layer forming composition was set as 4.0 parts, and the hole diameter of the filter used for the filtering of the back coating layer forming composition was changed to 0.5 μm.

Comparative Example 9

A magnetic tape was obtained in the same manner as in Example 1, except that the amount of alumina abrasive of the non-magnetic powder liquid for preparing the magnetic layer forming composition was set as 4.5 parts, and the hole diameter of the filter used for the filtering of the back coating layer forming composition was changed to 0.5 μm.

Evaluation Method (1) Average Particle Size of Ferromagnetic Powder

Regarding each ferromagnetic powder used in the examples and the comparative examples, an average particle size was obtained by the method described above using a transmission electron microscope H-9000 manufactured by Hitachi, Ltd. as the transmission electron microscope, and image analysis software KS-400 manufactured by Carl Zeiss as the image analysis software.

(2) Composition Analysis of ε-Iron Oxide Powder

Regarding Examples 1 to 10, Comparative Examples 1 to 6, 8, and 9, 12 mg of a sample powder was collected from the produced ε-iron oxide powder, a beaker containing 12 mg of this sample powder and 10 ml of hydrochloric acid having a concentration of 4 mol/L was held on a hot plate at a set temperature of 80° C. for 3 hours, to obtain a solution in which the ε-iron oxide powder was dissolved (totally dissolved). The obtained solution was filtered with a membrane filter having a hole diameter of 0.1 μm. The element analysis of the filtrate obtained as described above was performed by an ICP analysis device. By doing so, quantity of the substitutional atom of the iron atom was measured, and the composition of the ε-iron oxide powder represented by the compositional formula of $Ga_xCo_yTi_zFe_{(2-x-y-z)}O_3$ was specified from the measured result.

(3) Coercivity Hc in Vertical Direction

Regarding each magnetic tape of the examples and the comparative examples, the coercivity Hc in the vertical direction was measured at an applied magnetic field of 15 kOe by using an oscillation sample type magnetic-flux meter (manufactured by Toei Industry Co., Ltd.).

(4) Rz, Rp, and Ratio (Rp/Rz)

Regarding the surface of the magnetic layer, a measurement region was set to have a size of 40 μm×40 μm, and the a ten-point average roughness Rz and the maximum peak height Rp (arithmetical mean of values obtained by measurement of n=3) were obtained. Nanoscope 4 manufactured by Veeco Instruments, Inc. was used as AFM in a tapping mode RTESP-300 manufactured by BRUKER was used as a probe of AFM, a resolution was set as 512 pixel×512 pixel, and a scan speed was a speed measured regarding 1 screen (512 pixel×512 pixel) for 341 seconds. The ratio (Rp/Rz) was calculated as the ratio of Rp to Rz obtained as described above.

Evaluation of Electromagnetic Conversion Characteristics

A magnetic signal was recorded on each magnetic tape of the examples and the comparative examples in a tape longitudinal direction under the following conditions and reproduced with a magnetoresistive (MR) head. The reproduced signal was frequency-analyzed with a spectrum analyzer manufactured by Shibasoku Co., Ltd., and noise accumulated at 0 to 600 kfci was evaluated. The unit kfci is a unit of a linear recording density (cannot be converted into the unit SI). The electromagnetic conversion characteristics (initial stage of running) of each magnetic tape of the examples and the comparative examples was evaluated according to the following evaluation standard.

Recording and Reproduction Conditions
Recording: Recording track width 5 μm
Recording gap 0.17 μm
Head saturated magnetic flux density Bs 1.8 T
Reproduction: Reproduction track width 0.4 μm
Distance between shields (sh-sh distance) 0.08 μm
Evaluation standard
5: Substantially no noise, a signal is excellent, no error is observed.
4: A degree of noise is small and a signal is excellent.
3: Noise is observed. Signal is excellent.
2: A degree of noise is great and a signal is unclear.
1: Noise and signal cannot be distinguished or cannot be recorded.

In addition, each magnetic tape (length of 100 m) of the examples and the comparative examples was caused to repeatedly run 600 passes under the environment of the temperature of 37° C. and relative humidity of 87% at a running speed of 3 m/sec in a linear tester, to bring the surface of the magnetic layer and the magnetic head into contact with each other and slide on each other. The electromagnetic conversion characteristics (after repeated running) were evaluated by the same method as described above, after the repeated running.

The results from the above evaluation are shown in Table 1.

TABLE 1

| | Compositional formula $Ga_xCo_yTi_zFe(2-x-y-z)O_3$ | | | Average particle size (nm) | Rz (nm) | Rp (nm) | Ratio (Rp/Rz) | Hc (Oe) | electromagnetic conversion characteristics | |
|---|---|---|---|---|---|---|---|---|---|---|
| | Ga x | Co y | Ti z | | | | | | Initial stage of running | After repeated running |
| Example 1 | 0.24 | 0.05 | 0.05 | 11.2 | 37.5 | 17.6 | 0.47 | 2042 | 5 | 4 |
| Comparative Example 1 | 0.00 | 0.00 | 0.00 | 4.6 | 37.4 | 23.2 | 0.62 | 1912 | 1 | 1 |
| Example 2 | 0.00 | 0.00 | 0.00 | 5.8 | 37.5 | 21.8 | 0.58 | 2004 | 3 | 3 |
| Example 3 | 0.10 | 0.00 | 0.00 | 8.9 | 37.6 | 20.7 | 0.55 | 2091 | 4 | 4 |
| Example 4 | 0.30 | 0.05 | 0.05 | 15.4 | 37.8 | 20.0 | 0.53 | 2035 | 4 | 5 |
| Comparative Example 2 | 0.32 | 0.05 | 0.05 | 17.1 | 37.4 | 19.4 | 0.52 | 2043 | 2 | 2 |
| Comparative Example 3 | 0.24 | 0.05 | 0.05 | 11.2 | 34.5 | 17.6 | 0.51 | 1967 | 4 | 1 |
| Example 5 | 0.24 | 0.05 | 0.05 | 11.2 | 35.2 | 19.0 | 0.54 | 2011 | 4 | 3 |
| Example 6 | 0.24 | 0.05 | 0.05 | 11.2 | 44.1 | 25.6 | 0.58 | 2034 | 3 | 4 |
| Comparative Example 4 | 0.24 | 0.05 | 0.05 | 11.2 | 45.3 | 24.9 | 0.55 | 2078 | 2 | 4 |
| Comparative Example 5 | 0.32 | 0.05 | 0.05 | 11.4 | 36.5 | 20.8 | 0.57 | 1845 | 2 | 2 |
| Example 7 | 0.22 | 0.05 | 0.05 | 11.1 | 37.3 | 22.8 | 0.61 | 2497 | 5 | 4 |
| Example 8 | 0.15 | 0.05 | 0.05 | 11.4 | 37.8 | 22.7 | 0.60 | 3111 | 4 | 4 |
| Comparative Example 6 | 0.12 | 0.05 | 0.05 | 11.6 | 37.3 | 22.8 | 0.61 | 3225 | 2 | 2 |
| Comparative Example 7 | BaFe | | | 16.0 | 37.3 | 19.8 | 0.53 | 2413 | 2 | 2 |
| Comparative Example 8 | 0.24 | 0.05 | 0.05 | 11.2 | 35.3 | 8.1 | 0.23 | 2048 | 3 | 1 |
| Example 9 | 0.24 | 0.05 | 0.05 | 11.2 | 37.2 | 27.2 | 0.73 | 2032 | 3 | 3 |
| Example 10 | 0.24 | 0.05 | 0.05 | 11.2 | 43.2 | 40.6 | 0.94 | 2075 | 3 | 3 |
| Comparative Example 9 | 0.24 | 0.05 | 0.05 | 11.2 | 44.1 | 45.4 | 1.03 | 2063 | 1 | 3 |

From the results shown in Table 1, the magnetic tapes of Examples 1 to 10, excellent electromagnetic conversion characteristics can be observed both in the initial stage after the running and after the repeated running in the high temperature and high humidity environment.

One aspect of the invention is effective in a technical field of a magnetic recording medium for high-density recording.

What is claimed is:

1. A magnetic recording medium comprising:
a non-magnetic support; and
a magnetic layer including a ferromagnetic powder,
wherein the ferromagnetic powder is an ε-iron oxide powder having an average particle size of 5.0 nm to 16.0 nm,
a coercivity Hc in a vertical direction is 1,884 Oe to 3,141 Oe,
a ten-point average roughness Rz of a surface of the magnetic layer is 35.0 nm to 45.0 nm, and
a ratio Rp/Rz of a maximum peak height Rp of the surface of the magnetic layer to the Rz is 0.25 to 1.00.

2. The magnetic recording medium according to claim 1, wherein the Hc is 1,884 Oe to 2,950 Oe.

3. The magnetic recording medium according to claim 1, wherein the Hc is 1,884 Oe to 2,880 Oe.

4. The magnetic recording medium according to claim 1, wherein the Hc is 1,884 Oe to 2,500 Oe.

5. The magnetic recording medium according to claim 1, wherein the Rz is greater than 35.0 nm and equal to or smaller than 45.0 nm.

6. The magnetic recording medium according to claim 1, wherein the Rz is greater than 35.0 nm and equal to or smaller than 40.0 nm.

7. The magnetic recording medium according to claim 1, wherein the Rp/Rz is 0.40 to 1.00.

8. The magnetic recording medium according to claim 1, wherein the ratio Rp/Rz is 0.40 to 0.70.

9. The magnetic recording medium according to claim 1, wherein the ε-iron oxide powder contains one or more kinds of atom selected from the group consisting of a gallium atom, a cobalt atom, and a titanium atom.

10. The magnetic recording medium according to claim 1, further comprising:
a non-magnetic layer including a non-magnetic powder between the non-magnetic support and the magnetic layer.

11. The magnetic recording medium according to claim 1, further comprising:
a back coating layer including a non-magnetic powder on a surface of the non-magnetic support opposite to a surface provided with the magnetic layer.

12. A magnetic recording and reproducing device comprising:
the magnetic recording medium according to claim 1; and
a magnetic head.

13. The magnetic recording and reproducing device according to claim 12,
wherein the Hc is 1,884 Oe to 2,950 Oe.

14. The magnetic recording and reproducing device according to claim 12,
wherein the Hc is 1,884 Oe to 2,880 Oe.

15. The magnetic recording and reproducing device according to claim 12,
wherein the Hc is 1,884 Oe to 2,500 Oe.

16. The magnetic recording and reproducing device according to claim 12,
wherein the Rz is greater than 35.0 nm and equal to or smaller than 45.0 nm.

17. The magnetic recording and reproducing device according to claim 12,
wherein the Rz is greater than 35.0 nm and equal to or smaller than 40.0 nm.

18. The magnetic recording and reproducing device according to claim 12,
wherein the Rp/Rz is 0.40 to 1.00.

19. The magnetic recording and reproducing device according to claim 12,
wherein the ratio Rp/Rz is 0.40 to 0.70.

20. The magnetic recording and reproducing device according to claim 12,
wherein the ε-iron oxide powder contains one or more kinds of atom selected from the group consisting of a gallium atom, a cobalt atom, and a titanium atom.

* * * * *